(12) United States Patent
Kawakubo et al.

(10) Patent No.: US 8,109,144 B2
(45) Date of Patent: Feb. 7, 2012

(54) INERTIA SENSOR

(75) Inventors: Takashi Kawakubo, Kanagawa (JP);
Toshihiko Nagano, Kanagawa (JP);
Michihiko Nishigaki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 406 days.

(21) Appl. No.: 12/412,176

(22) Filed: Mar. 26, 2009

(65) Prior Publication Data

US 2010/0077858 A1   Apr. 1, 2010

(30) Foreign Application Priority Data

Sep. 26, 2008   (JP) ................................. 2008-248308

(51) Int. Cl.
*G01C 19/00* (2006.01)
*G01P 3/44* (2006.01)
*G01P 9/00* (2006.01)
*G01P 15/08* (2006.01)
*G01P 15/09* (2006.01)

(52) U.S. Cl. .................................. 73/504.12; 73/514.34

(58) Field of Classification Search .............. 73/514.12, 73/504.12, 514.34, 514.29
See application file for complete search history.

(56) References Cited

U.S. PATENT DOCUMENTS 5,650,568 A * 7/1997 Greiff et al. ................ 73/504.09
5,734,105 A   3/1998 Mizukoshi
2010/0058861 A1 * 3/2010 Kuang et al. ................ 73/504.12

FOREIGN PATENT DOCUMENTS

JP   6-123632   5/1994

OTHER PUBLICATIONS

U.S. Appl. No. 12/411,861, filed Mar. 26, 2009, of Kawakubo, entitled Multiaxial Acceleration Sensor and Angular Velocity Sensor.

* cited by examiner

*Primary Examiner* — Lisa Caputo
*Assistant Examiner* — Roger Hernandez-Prewitt
(74) *Attorney, Agent, or Firm* — Finnegan, Henderson, Farabow, Garrett & Dunner, L.L.P.

(57) ABSTRACT

A multi-axis accelerometer or a multi-axis angular rate sensor which can be made by an easy process and the size of which can be greatly reduced is provided. An inertia sensor has a substrate, a flat proofmass formed on the substrate and a stacked structure including at least a lower electrode, a piezoelectric film, and an upper electrode, an anchor unit formed in a cutout inside of the proofmass and fixed on the substrate, and a plurality of flat piezoelectric beams each having one end connected to the proofmass, the other end connected to the anchor unit, and a stacked structure formed in a cutout inside of the proofmass and including at least a lower electrode, a piezoelectric film, and an upper electrode, wherein the inertia sensor enables to detect an acceleration applied on the proofmass based on charges generated to the electrodes of the piezoelectric beams.

8 Claims, 16 Drawing Sheets

INERTIA SENSOR

CROSS-REFERENCE TO RELATED APPLICATION

This application is based upon and claims the benefit of priority from Japanese Patent Applications No. 2008-248308, filed on Sep. 26, 2008, the entire contents of which are incorporated herein by reference.

FIELD OF THE INVENTION

The present invention relates to an inertia sensor using a piezoelectric device capable of detecting an acceleration or an angular velocity in two- or three-axis directions.

BACKGROUND OF THE INVENTION

A multi-axis accelerometer and a multi-axis angular rate sensor which are small in size and has high reliability are desired by electronics industries, automobile industries, machine industries, and the like.

To cope with the demand, a capacitive type accelerometer is widely used as a multi-axis accelerometer. The capacitive type accelerometer is arranged such that a proofmass is connected to anchor units disposed at several positions on a substrate through springs, and the offset of the proofmass generated by an acceleration applied to the proof mass is detected by the change of a capacitance between a comb-teeth shaped electrode disposed to the proofmass and a comb-teeth shaped electrode fixed to the substrate.

Further, there is also proposed a structure similar to the multi-axis accelerometer as a multi-axis angular rate sensor (for example, JP-A H6-123632 (KOKAI)). More specifically, a proofmass is connected to anchor units disposed at several positions on a substrate through springs, and an alternate voltage is applied between a comb-teeth shaped electrode disposed to the proofmass and a comb-teeth shaped electrode fixed to the substrate. Then, the proofmass is excited by electrostatic force, and the offset of the proofmass generated by Coriolis force applied to the proofmass is detected by the change of a capacitance between the comb-teeth shaped electrode disposed to the proofmass and the comb-teeth shaped electrode fixed to the substrate. This type of the electrostatic type angular rate sensor is widely used.

In general, the sensor described above making use of the change of the capacitance has a disadvantage in that it is difficult for the sensor to process a signal because a formed capacitance is very small although the sensor has an advantage in that a manufacturing cost is low.

SUMMARY OF THE INVENTION

An inertia sensor according to an embodiment of the present invention includes a substrate, a flat proofmass formed on the substrate and having a stacked structure including at least a lower electrode, a piezoelectric film, and an upper electrode, an anchor unit formed in a cutout inside of the proofmass and fixed on the substrate, and a plurality of flat piezoelectric beams each having one end connected to the proofmass, the other end connected to the anchor unit, and having a stacked structure formed in a cutout inside of the proofmass and including at least a lower electrode, a piezoelectric film, and an upper electrode, wherein the inertia sensor enables to detect an acceleration applied on the proofmass based on charges generated to the electrodes of the piezoelectric beams.

An inertia sensor according to an embodiment of the present invention includes a substrate, a flat proofmass formed on the substrate and having a stacked structure including at least a lower electrode, a piezoelectric film, and an upper electrode, an anchor unit formed in a cutout inside of the proofmass and fixed on the substrate, and a plurality of flat piezoelectric beams each having one end connected to the proofmass, the other end connected to the anchor unit, and having a stacked structure formed in a cutout inside of the proofmass and including at least a lower electrode, a piezoelectric film, and an upper electrode, wherein the inertia sensor applies a resonating motion in one direction to the proofmass by any of the plurality of piezoelectric beams and enables to detect Coriolis force applied on the proofmass based on a charge generated to any of the plurality of piezoelectric beams.

According to the present invention, there is provided a multi-axis accelerometer or a multi-axis angular rate sensor which can be made by an easy process and the size of which can be greatly reduced.

DETAILED DESCRIPTION OF THE EMBODIMENTS

Figure 1:
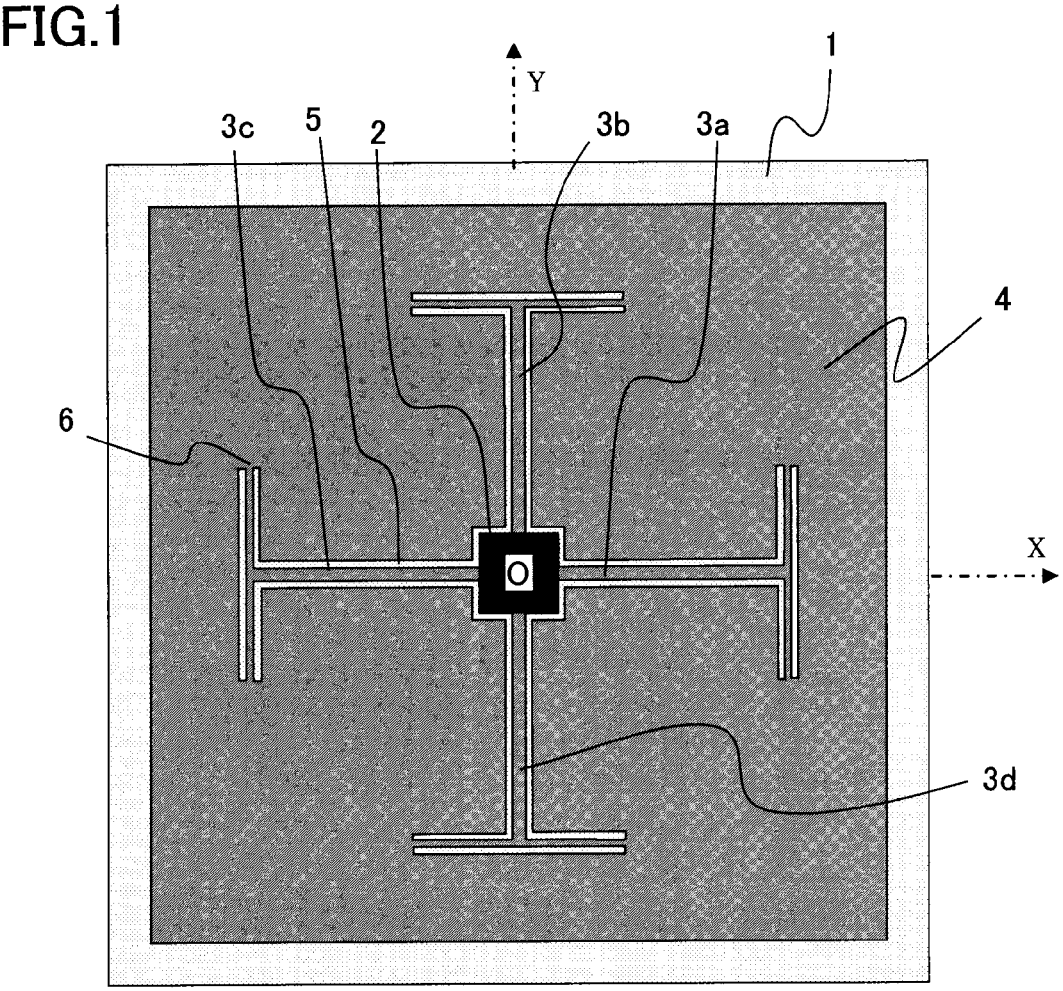
FIG. 1 is a top view of an accelerometer of an embodiment 1.

Inertia sensors of embodiments of the present invention will be explained referring to the drawings. Note that, in the specification, "piezoelectric beam" is used as a term including all the beams such as a detection beam of an accelerometer and a detection beam or an excitation beam of an angular rate sensor.

Embodiment 1

An inertia sensor of an embodiment 1 has a substrate, a flat proofmass formed on the substrate and having a stacked structure including at least a lower electrode, a piezoelectric film, and an upper electrode, an anchor unit formed in a cutout inside of the proof mass and fixed on the substrate, and a plurality of flat piezoelectric beams each having one end connected to the proofmass, the other end connected to the anchor unit, and having a stacked structure formed in a cutout portion in the proofmass and including at least a lower electrode, a piezoelectric film, and an upper electrode. The inertia sensor enables to detect an acceleration applied on the proofmass based on the charges generated to the respective electrodes of the detection beams.

The inertia sensor of the embodiment is an accelerometer having the above arrangement. The accelerometer can cancel the influence of warp and residual stress generated to the proofmass and the piezoelectric films constituting the detection beams when the accelerometer is manufactured by supporting the proofmass by the anchor unit formed in the proofmass and the piezoelectric beams (detection beams). Accordingly, an accelerometer having an excellent performance can be easily manufactured using a piezoelectric device. Further, since the accelerometer has such a structure that the piezoelectric beams are disposed inside of the proofmass in place of being disposed externally of the proofmass, the size of the accelerometer can be greatly reduced.

Figure 2:
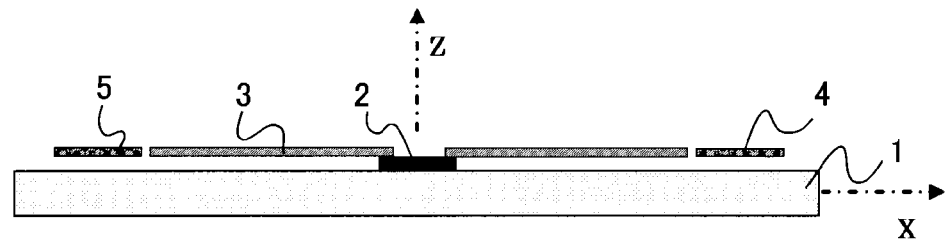
FIG. 2 is a cross sectional view of the accelerometer of FIG. 1.

FIG. 1 is a top view of the accelerometer of the embodiment 1. FIG. 2 is a cross sectional view of the accelerometer of FIG. 1. The accelerometer has a substrate 1, an anchor unit 2 fixed to a center of the substrate 1, four detection beams 3a to 3d having one ends connected to the anchor units 2. And the sensor has a proofmass 4 to which the other ends of the detection beams 3a to 3d are connected at two positions, i.e., at two junctions 6. A cutout 5 is formed in the proofmass 4 and has the anchor units 2 and the detection beams 3a to 3d disposed therein. As described above, the detection beams 3a to 3d and the proofmass 4 are formed on the substrate 1 and formed in a flat-sheet-shape, respectively.

In the specification, a three-dimensional X-, Y-, Z-coordinate system is defined by setting an origin O at the center of the proofmass 4 and setting an X-axis, a Y-axis, and a Z-axis in arrow directions of FIGS. 1 and 2, respectively in consideration of the convenience of explanation. An X-Y plane is in parallel with the upper surface of the substrate 1, and the Z-axis is vertical to the X-Y plane. FIG. 2 corresponds to a cross section of the accelerometer when it is cut along the X-axis shown in FIG. 1.

As shown in FIG. 1, the anchor unit is formed at the center of gravity (here origin O) of the proofmass 4. The four T-shaped detection beams 3a to 3d are disposed so as to radially connect the anchor units 2 to the proofmass 4. As described above, the plurality of detection beams are symmetrically formed with respect to the center of gravity. Here, although the two piezoelectric beams 3a and 3c disposed on the X-axis are used to detect Y-axis and Z-axis accelerations and the two piezoelectric beams 3b and 3d disposed on the Y-axis are used to detect X-axis and Z-axis accelerations, these piezoelectric beams 3a to 3d have the same structure.

Figure 3:
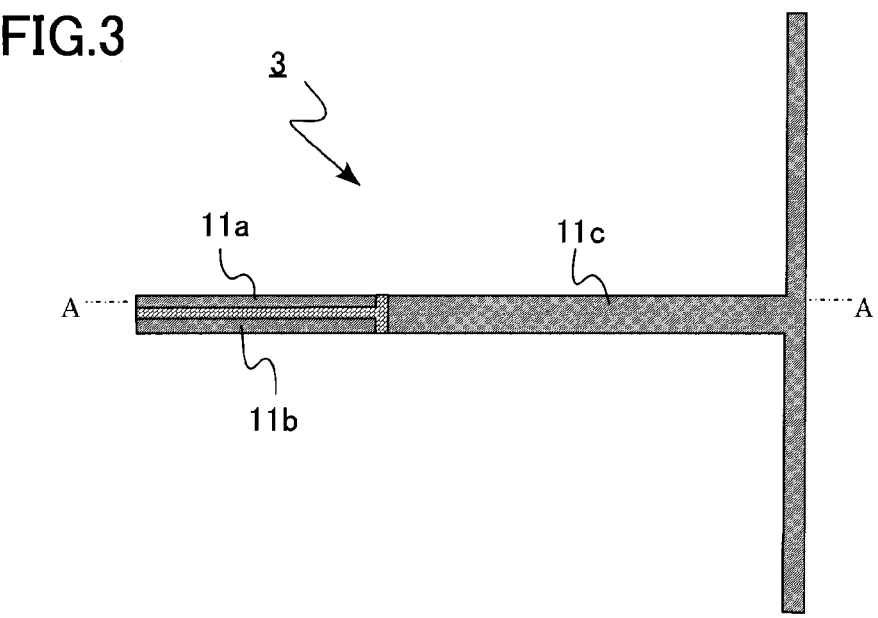
FIG. 3 is a plan view of each of piezoelectric beams of the accelerometer of the embodiment 1.
Figure 4:
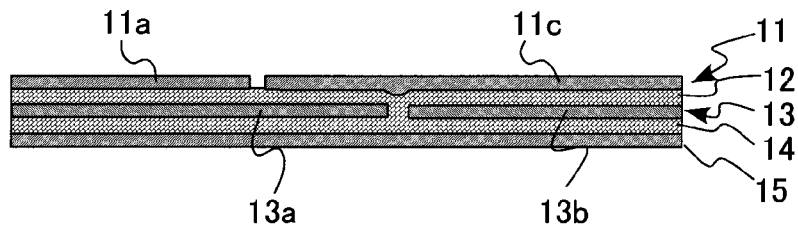
FIG. 4 is a sectional view taken along A-A line of FIG. 3.

FIG. 3 is a plan view of each of the piezoelectric beams 3a to 3d. FIG. 4 is a sectional view taken along A-A line of FIG. 3. Each of the piezoelectric beams 3a to 3d has a stacked structure in which an upper electrode 11, an upper piezoelectric film 12, an intermediate electrode 13, a lower piezoelectric film 14, and a lower electrode 15 are sequentially stacked from the upper surface thereof in this order. Each of the piezoelectric films 12 and 14 has a polarization in a Z-axis direction. For example, the electrodes 11, 13, 15, are formed of Al having a thickness of 200 nm, and the piezoelectric films 12, 14 are formed of AlN having a thickness of 2 μm. The AlN of the piezoelectric films 12, 14 is oriented in a vertical direction with respect to a film surface.

The upper electrode 11 is divided to a first portion 11a, a second portion 11b, and a third portion 11c. Further, the intermediate electrode 13 is divided to a first portion 13a and a second portion 13b. The proofmass 4 also has a stacked structure similar to those of the piezoelectric beams 3a to 3d. Further, although not shown here, the upper electrode 11, the intermediate electrode 13, and the lower electrode 15 can be electrically drawn out and wired to an electrode layer formed on the substrate 1 through, for example, a through hole formed to the anchor units 2.

Figure 5:
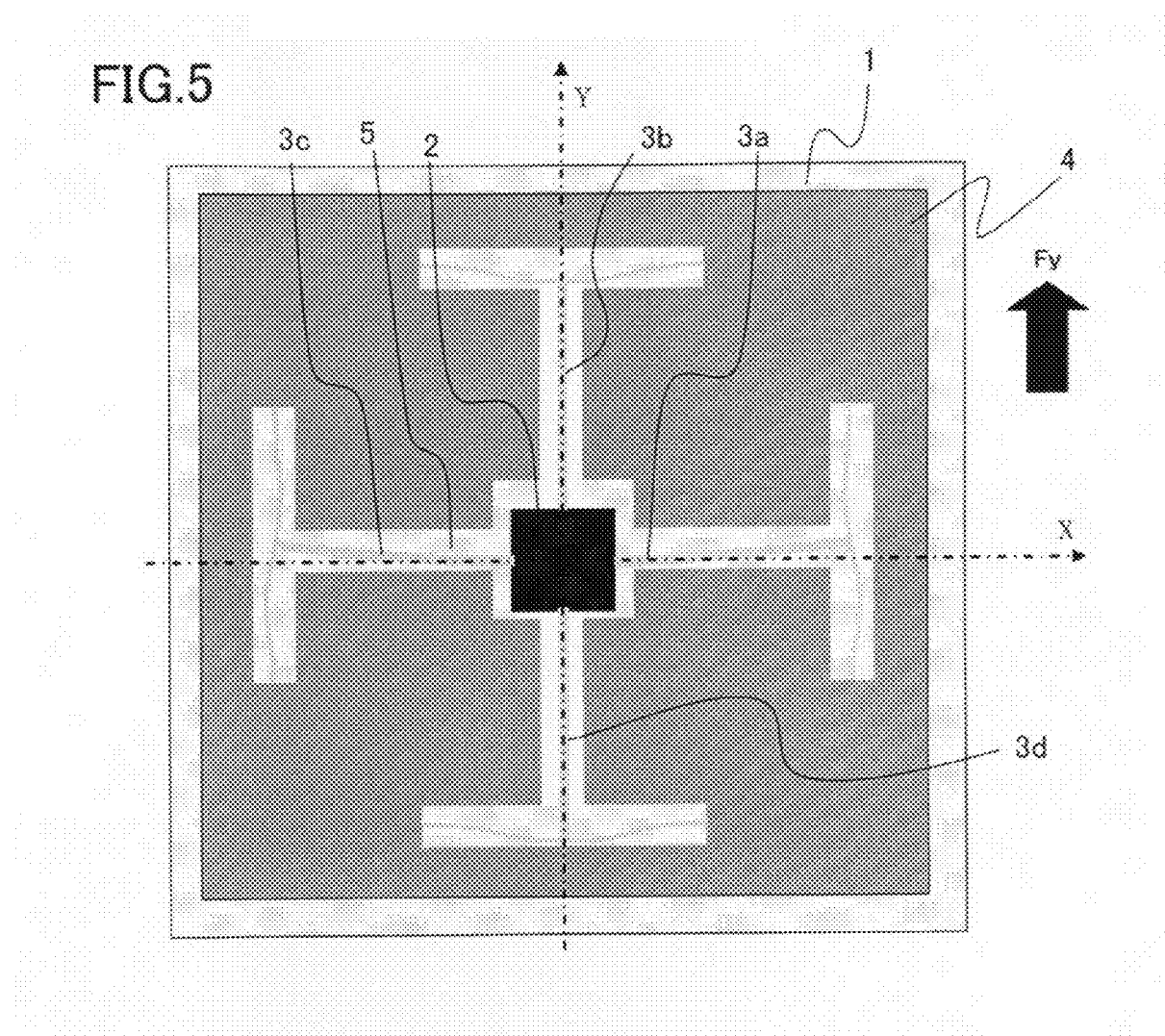
FIG. 5 is an explanatory view of an action of the accelerometer of the embodiment 1.

FIG. 5 is a view explaining an action of the accelerometer of the embodiment. A phenomenon, which occurs when an acceleration is applied on the accelerometer described above, will be explained below. When it is assumed that an acceleration is applied on the proofmass 4 in a Y-axis direction, force Fy (having a magnitude proportional to the mass of the proofmass 4) is generated to the Y-axis direction in the proofmass 4, and the piezoelectric beams 3a to 3d, each of which has one end fixed to the anchor units 2 and the other end connected to the proofmass 4, are flexed as shown in FIG. 5.

When the piezoelectric beams 3a, 3c disposed along the X-axis are observed in the vicinities of the portions where they are connected to the anchor units 2 thereof, they are flexed in a lateral direction in a plane, which is preferable to detect strain. Since a load is applied to the piezoelectric beams 3b, 3d disposed along the Y-axis in an axial direction, they are not flexed in the lateral direction and generate a small amount of strain in the axial direction.

Figure 6:
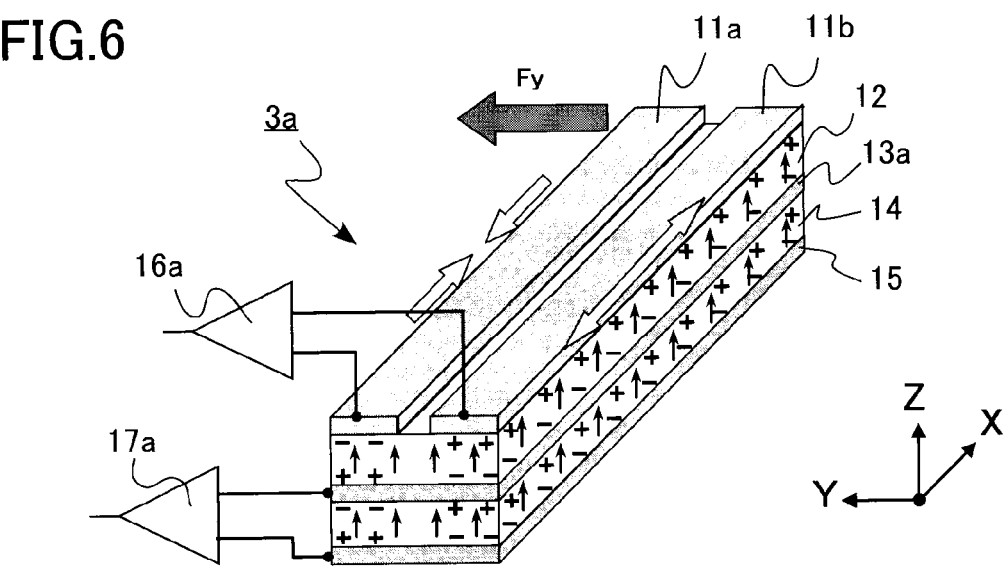
FIG. 6 is a view explaining stress generated to a piezoelectric beam of the accelerometer of the embodiment 1 and a piezoelectric operation thereof in detail.

FIG. 6 is a detailed explanatory view of the stress generated to the piezoelectric beam 3a and the piezoelectric action thereof. Tension strain is generated to the side surface of the −Y side of the piezoelectric beams 3a, and compressive strain is generated to the side surface of the +Y side thereof by the force Fy as shown by white arrows in the drawing. At the time, a negative charge is generated to the electrode 11a, and a positive charge is generated to the electrode 11b. Accordingly, the magnitude of the force Fy can be found by measuring the potential difference between the electrodes 11a and 11b by a differential amplifier 16a. Note that since the charges generated to the +Y side and the −Y side are cancelled in the intermediate electrode 13a to the lower electrode 15, no potential difference is generated. A potential difference similar to that of the piezoelectric beam 3a is also generated to the still another piezoelectric beam 3c disposed along the X-axis.

In contrast, since a small amount of tensile stress is applied to the piezoelectric beam 3d disposed along the Y-axis in the axial direction, a positive charge is generated to both the electrodes 11a and 11b at the time. Accordingly, no potential difference is generated between the electrodes 11a and 11b. Further, since a small negative charge is generated to the electrode 15, a small positive potential difference is generated between the electrodes 13a and 15. Since a small amount of compressive stress is applied to the still another piezoelectric beams 3d disposed along the Y-axis in the axial direction and a negative charge is generated to both the electrodes 11a and 11b at the time, no potential difference is generated between the electrodes 11a and 11b. Further, since a small positive charge is generated to the electrode 15, a small negative potential difference is generated between the electrodes 13a and 15.

Table 1 collectively shows that potential differences generated among the respective electrodes of the piezoelectric beams 3a to 3d when the force Fy is applied in the Y-axis direction.

TABLE 1

| | Detection Beams | | | | | | |
|---|---|---|---|---|---|---|---|
| | 3a | 3b | 3c | 3d | 3a + 3c | 3b + 3d | 3a + 3b + 3c + 3d |
| Electrode 11a-11b | −− | 0 | −− | 0 | −− | 0 | |
| Electrode 13a-15 | 0 | + | 0 | − | | | 0 |

Next, it is examined a case that an acceleration is applied on the proofmass 4 in an X-axis direction.

Likewise, when the piezoelectric beams 3b, 3d disposed along the Y-axis are observed in the vicinities of the portions where they are connected to the anchor units 2 thereof, they are flexed in the lateral direction in the plane, which is preferable to detect strain. In contrast, the piezoelectric beams 3a, 3c disposed along the X-axis are not flexed in the lateral direction. Accordingly, the magnitude of force Fx can be found by measuring the potential difference between the upper electrodes 11a and 11b of the piezoelectric beams 3a to 3d. Note that since the charges generated to the +Y side and the −Y side are cancelled in the intermediate electrode 13 to the lower electrode 15, no potential difference is generated. Since the potential differences between the electrodes of the other piezoelectric beams can be considered likewise the case that an acceleration is applied in the Y-axis direction, Table 2 collectively shows the potential differences.

TABLE 2

| | Detection Beams | | | | | | |
|---|---|---|---|---|---|---|---|
| | 3a | 3b | 3c | 3d | 3a + 3c | 3b + 3d | 3a + 3b + 3c + 3d |
| Electrode 11a-11b | 0 | −− | 0 | −− | 0 | −− | |
| Electrode 13a-15 | + | − | | | | | 0 |

Figure 7:
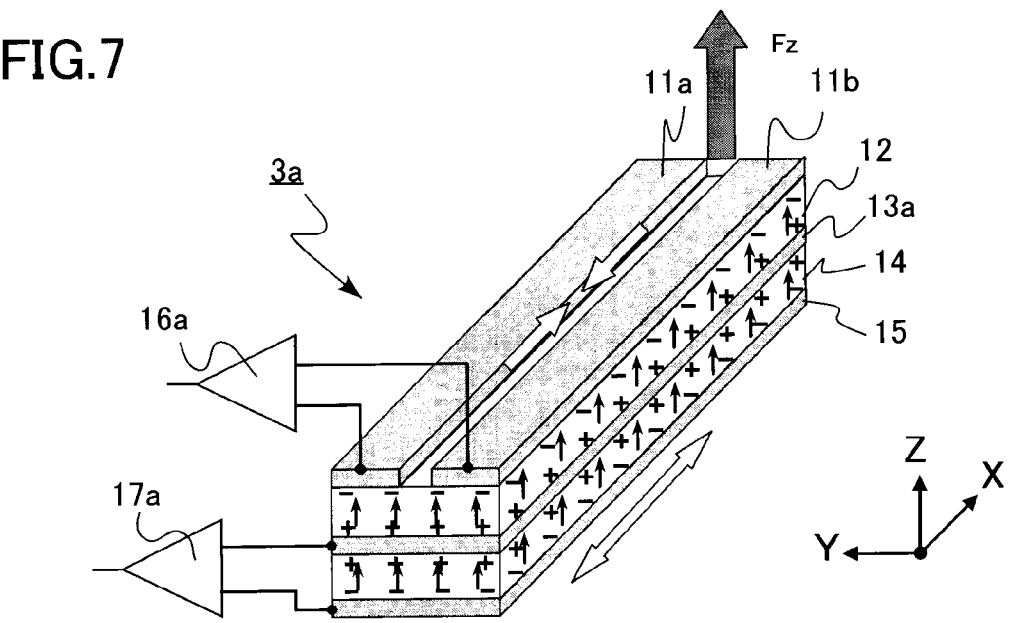
FIG. 7 is a view explaining stress generated to the piezoelectric beam of the accelerometer of the embodiment 1 and a piezoelectric operation thereof in detail.

Further, a case that an acceleration is applied on the proofmass 4 in the Z-axis direction will be examined. When all the piezoelectric beams 3a to 3d are observed in the vicinity of the portion connected to the anchor units 2 of the piezoelectric beams 3a to 3d, they are flexed upward, which is preferable to detect strain. FIG. 7 is a detailed explanatory view of the stress generated to the piezoelectric beam 3a and the piezoelectric action thereof. Compressive strain is generated to the upper surface of the piezoelectric beam 3a on the +Z side thereof and tensile strain is generated to the lower surface of the piezoelectric beam 3a on the −Z side thereof by the force Fz. At the time, a positive charge is generated to the electrode 13, and a negative charge is generated to the electrode 15. Accordingly, the magnitude of the force Fz can be found by measuring the potential difference between the electrodes 13a and 15 by a differential amplifier 17a. Note that since the same negative charge is generated between the upper electrodes 11a and 11b, no potential difference is generated between the electrodes 11a and 11b.

This is entirely the same as the piezoelectric beams 3a as to the piezoelectric beams 3b to 3d. Table 3 collectively shows that the potential differences generated between the respective electrodes.

TABLE 3

| | Detection Beams | | | | | | |
|---|---|---|---|---|---|---|---|
| | 3a | 3b | 3c | 3d | 3a + 3c | 3b + 3d | 3a + 3b + 3c + 3d |
| Electrode 11a-11b | 0 | 0 | 0 | 0 | 0 | 0 | |
| Electrode 13a-15 | ++ | ++ | ++ | ++ | | | ++ |

As described above, when an acceleration is applied on the proofmass 4 in the X-, Y-, or Z-axis direction, a charge is generated in a mode which is specific to each of the piezoelectric beams depending on each case. Moreover, a generated charge has an amount relating to the magnitude of an acceleration and the generated charge has a polarity which is determined depending on the direction of the acceleration applied on the proofmass 4. When, for example, force −Fy is applied in a −Y-axis direction in FIG. 6, the signs of the charges generated to the respective electrodes are reversed. Likewise, when force −Fz is applied in a −Z-axis direction in FIG. 7, the signs of the charges generated to the respective electrodes are reversed. Accordingly, the accelerations in the respective X-, Y-, Z-axis directions can be detected by detecting the charges generated to the respective piezoelectric beams.

FIG. 8 is a view showing a detection circuit in the accelerometer of the embodiment. When the potential differences generated between the respective electrodes of the piezoelectric beams 3a to 3d described above are combined by the detection circuit, the accelerations in the X-, Y-, Z-axis directions can be independently detected more accurately.

Figure 8A:
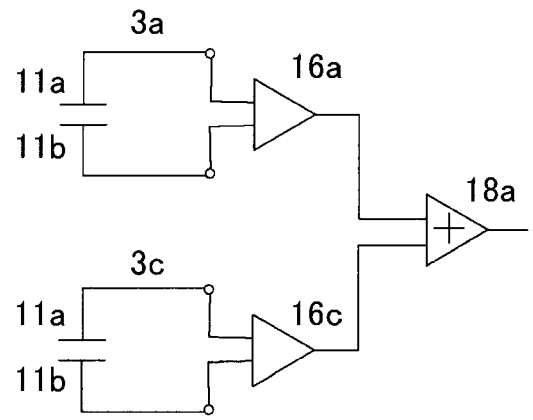
FIGS. 8A to 8C are views showing a detection circuit of the accelerometer of the embodiment 1.

FIG. 8A is a circuit for detecting an acceleration in the Y-axis direction. The potential difference between the electrodes 11a and 11b of the piezoelectric beams 3a and 3c is detected by the differential amplifier 16a and a differential amplifier 16c, respectively, and the sum of the outputs of the differential amplifiers 16a and 16c is measured by an addition amplifier 18a.

Figure 8B:
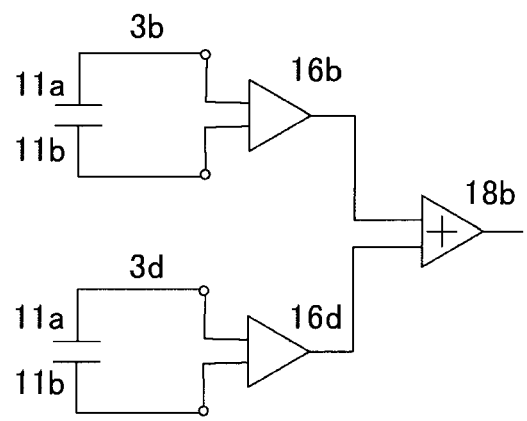

FIG. 8B is a circuit for detecting an acceleration in the X-axis direction. The potential difference between the electrodes 11a and 11b of the piezoelectric beams 3b and 3d is detected by the differential amplifier 16b and a differential amplifier 16d, respectively, and the sum of the outputs of the differential amplifiers 16b and 16d is measured by an addition amplifier 18b.

Figure 8C:
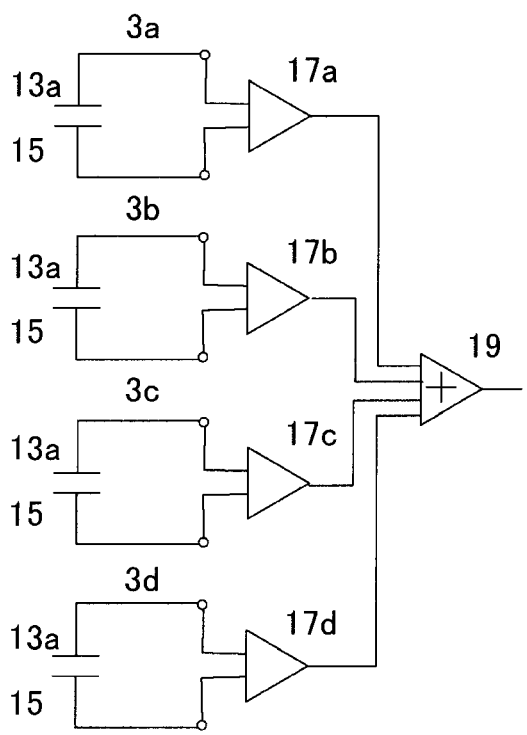

FIG. 8C shows a circuit for detecting an acceleration in the Z-axis direction. The potential difference between the electrodes 13a and 15 of the piezoelectric beams 3a to 3d is detected by the differential amplifier 17a and differential amplifiers 17b to 17d, respectively, and the sum of the outputs of the differential amplifiers 17a to 17d is measured by an addition amplifier 19.

Tables 1 to 3 show the output detected by the circuits of FIGS. 8A to 8C when the accelerations is applied in the Y-, X-, and Z-axis directions. It is apparent that accelerations in the Y-, X-, and Z-axis directions are independently detected by the respective circuits.

The accelerometer in the embodiment is arranged such that the anchor unit is disposed at the center, the piezoelectric beams are radially connected from the anchor unit, and the proofmass, which is made to entirely surround the anchor unit and the piezoelectric beams, is connected to the other ends of the piezoelectric beams. Further, the piezoelectric beams and the proofmass are made on a flat sheet by a bimorph structure in which the piezoelectric films and the electrodes are stacked.

This structure can prevent that it is affected by the residual stress in film formation which remains in the piezoelectric films. When a flat structure mainly composed of piezoelectric films is made by a film forming method, it is indispensable that the structure be somewhat affected by the residual stress in the piezoelectric films which is generated when they are formed. When, for example, there is a difference between the residual stress of the upper piezoelectric film (12 of FIG. 4) and that of the lower piezoelectric film (14 of FIG. 4) each of which constitutes the bimorph structure, the flat structure warps up or down, and thus there is a possibility that the flat structure formed above a substrate comes into contact with the substrate and fails to operate. Accordingly, it is very difficult to stably make the structure.

Figure 9:
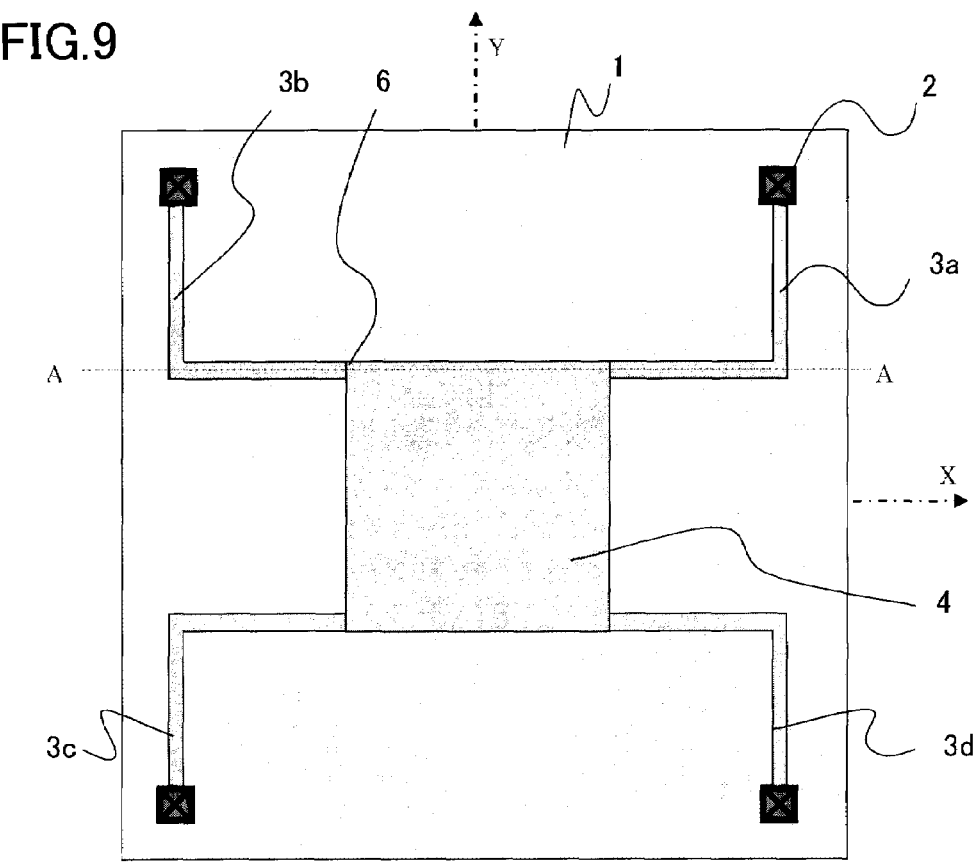
FIG. 9 is a plan view of the accelerometer having piezoelectric beams and an anchor unit disposed externally of a proofmass.

FIG. 9 is a plan view of an accelerometer having piezoelectric beams and anchor units disposed externally of a proofmass. The accelerometer is arranged such that the anchor units 2 are disposed at the four corners of a substrate 1, L-shaped piezoelectric beams 3a to 3d are connected to the anchor units 2, and a proofmass 4 disposed at a center is connected to junctions 6 of the other ends of the piezoelectric beams 3a to 3d.

Each of the piezoelectric beams 3a to 3d and the proofmass 4 is composed of an upper electrode 11, an upper piezoelectric film 12, an intermediate electrode 13, a lower piezoelectric film 14, a lower electrode 15 likewise the embodiment 1. For example, the electrodes have a thickness of 200 nm and the piezoelectric films have a thickness of 2 μm.

In the structure, since residual stress is controlled in a range of ±50 MPa when the piezoelectric films are formed, a certain degree of the difference between the residual stress of the upper piezoelectric film and that of the lower piezoelectric film is inevitable.

Figure 10:
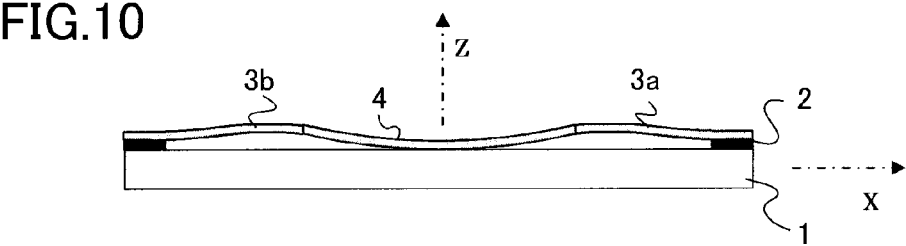
FIG. 10 is a cross sectional view taken along A-A line of FIG. 9.
Figure 11:
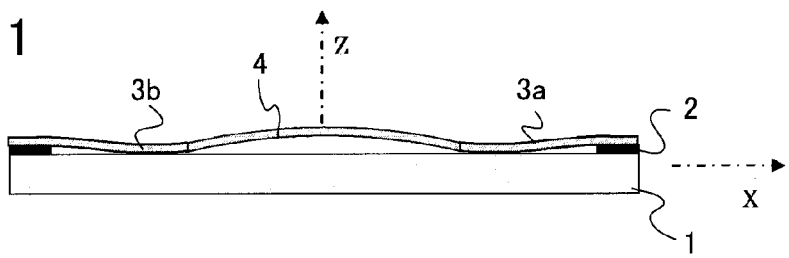
FIG. 11 is a cross sectional view taken along A-A line of FIG. 9.

FIG. 10 is a cross sectional view taken along A-A line of FIG. 9 when the upper electrode is subjected to tensile stress as compared with the lower electrode. It is found that the proofmass 4 is warped down in convex and a central portion of the proofmass 4 comes in to contact with the substrate 1. In contrast, FIG. 11 is a cross sectional view taken along A-A line of FIG. 9 when the upper electrode is subjected to compressive stress as compared with the lower electrode. It is found that the proofmass 4 is warped up in convex and the peripheral edge of the proofmass 4 comes in to contact with the substrate 1.

As described above, in the structure in which the anchor units are disposed externally of or to an outside of the proofmass different from the embodiment and the piezoelectric beams are connected between the anchor units and the proofmass at the center, when the proofmass and the piezoelectric beams are warped by the residual stress of the piezoelectric films, a part of the proofmass comes into contact with the substrate regardless that they are warped up or down, from which a problem arises in that the structure cannot preferably functions as an inertia sensor. In other words, it is very difficult to make a structure in which a part of a proofmass does not come into contact with a substrate.

Figure 12:
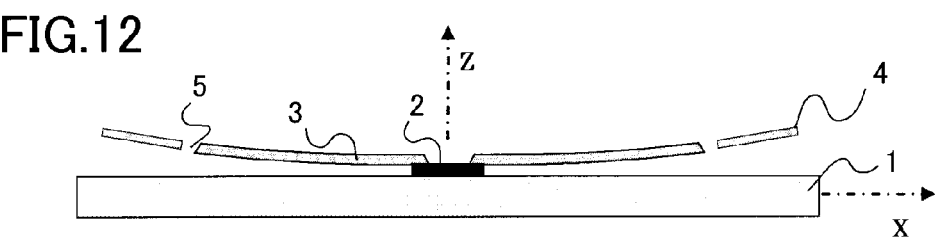
FIG. 12 is a cross sectional view of the accelerometer of the embodiment 1.

In contrast, in the embodiment, the proofmass and the piezoelectric beams formed in the flat shape are supported only by the anchor unit at the center in their entirety. FIG. 12 is a cross sectional view of the accelerometer of the embodiment. As shown in FIG. 12, according to the structure of the embodiment, when the flat structure is warped up, the structure can be stably supported without coming into contact with the substrate. Accordingly, it is possible to easily and stably make the structure. Further, even if tensile residual stress and compressive residual stress are generated, since the structure is supported only by the anchor unit at the center, the tensile residual stress and the compressive residual stress are canceled and the beams are not deformed. Further, it is very advantageous in that the size of the structure can be greatly reduced that the piezoelectric beams and the anchor unit are made inside of the proofmass internal as compared with a case in which they are disposed externally of the proofmass. Further, since a piezoelectric device of AlN is used as the piezoelectric beam, a precise detection can be carried out without compensating a film temperature.

Note that it is preferable that the anchor unit 2 be formed at the center of gravity of the proofmass 4 and that the plurality of piezoelectric beams 3a to 3d be formed symmetrically to the center of gravity to operate the accelerometer in good balance. However, the present invention is not necessarily limited to the above structure.

Further, the case in which the four piezoelectric beams 3a to 3d are used is exemplified here as shown in FIG. 1. However, the number of the piezoelectric beams is not limited to four as long as a plurality of the piezoelectric beams are provided.

Further, as shown in FIG. 1, the case, in which each of the piezoelectric beams 3a to 3d is formed in the T-shape and connected to the proofmass 4 at the two positions, is explained. This structure is preferable to monitor accelerations in the X- and Y-axis directions at the same time. However, the piezoelectric beam may have, for example, an L-shaped structure in which it has at least a bending portion at least one position and can be flexibly deformed in orthogonal two directions, a crank-shaped structure, or a structure in which a loop shape is formed in a mid-portion.

Further, AlN is preferably used as a material of the piezoelectric films from the view point of easiness of a film formation process, compatibility with a CMOS process, a piezoelectric performance, and the like. However, other materials having a piezoelectric property, for example, ZnO, PZT (Pb (Ti, Zr)O$_3$), and the like may be applied to the piezoelectric films.

The accelerometer of the embodiment can be made using an existing process. FIGS. 13A to 13E are schematic cross-sectional views showing a method of manufacturing the accelerometer of the embodiment in an order of processes. A cross section of the piezoelectric beam is shown here.

Figure 13A:
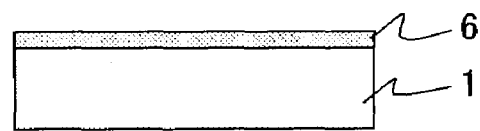
FIGS. 13A to 13E are schematic cross-sectional views showing a method of manufacturing the accelerometer of the embodiment 1 in an order of processes.

First, as shown in FIG. 13A, a sacrifice layer 6 is formed on a surface of the substrate 1. Although an inorganic material, a metal material, and an organic material, which can be selectively etched to other film materials, can be used as the sacrifice layer 6, explanation will be made here as to a case that amorphous silicon is used.

Figure 13B:
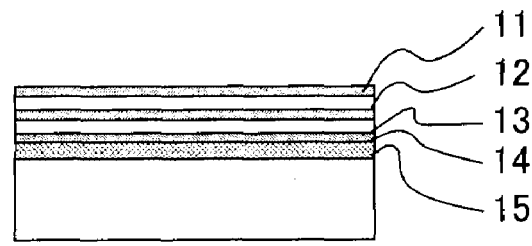

Next, as shown in FIG. 13B, the lower electrode 15, the lower piezoelectric film 14, the intermediate electrode 13, the upper piezoelectric film 12, and the upper electrode 11 are formed on the sacrifice layer 6. Al having a thickness of, for example, 200 nm is used as the electrodes 11, 13, and 15, and AlN having a thickness of, for example, 2 µm is used as the piezoelectric films 12 and 14, and they are made by sputtering.

Figure 13C:
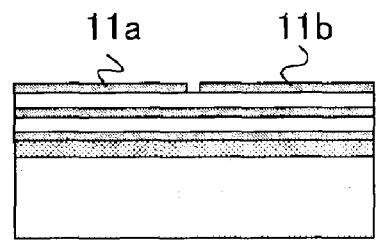

Next, as shown in FIG. 13C, the upper electrodes 11a and 11b are formed by executing patterning using a known lithography and a known etching method.

Figure 13D:
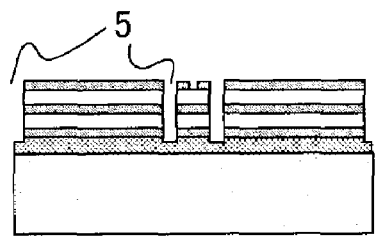

Next, as shown in FIG. 13D, the etching groove 5 is formed by executing patterning using the known lithography and the known etching method.

Figure 13E:
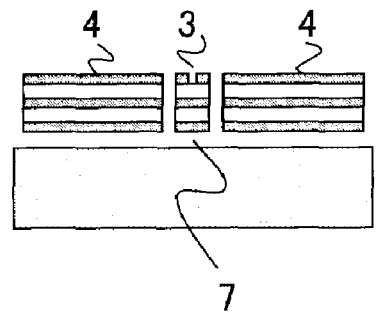

Next, as shown in FIG. 13E, the sacrifice layer 6 is removed by selective etching using XeF$_2$ as an etching gas.

The accelerometer of the embodiment can made by the processes described above.

First Modification of Embodiment 1

Figure 14:
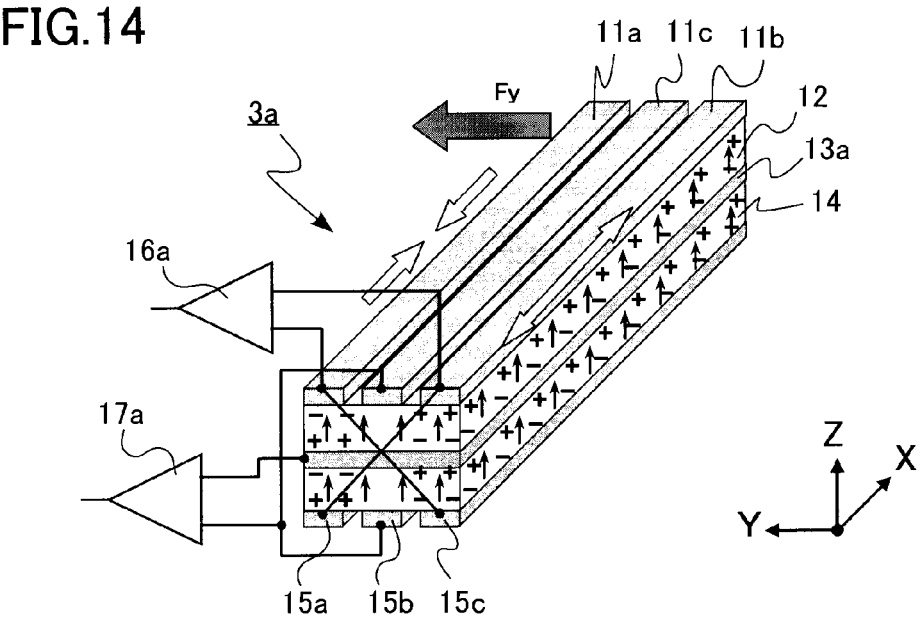
FIG. 14 is an explanatory view of a detection principle of a first modification of the embodiment 1.
Figure 15:
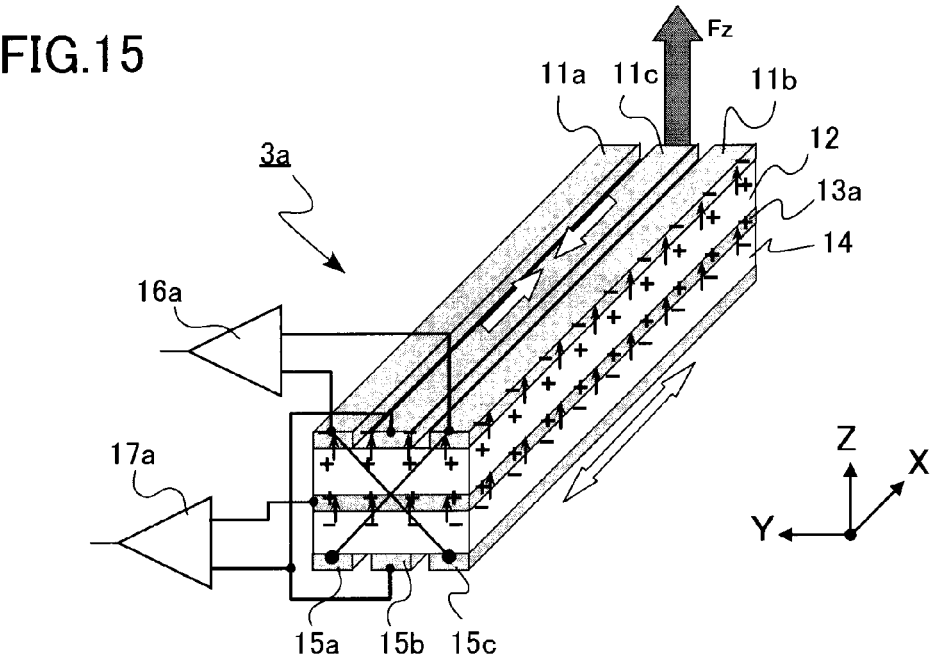
FIG. 15 is an explanatory view of the detection principle of the first modification of the embodiment 1.

The first modification is an example in which piezoelectric beams 3a to 3d have electrodes arranged differently from those of the embodiment 1. FIGS. 14 and 15 are explanatory views of a detection principle when accelerations are applied to an accelerometer of the first modification in X- and Z-axis directions.

An upper electrode 11 is divided to upper sub-electrodes 11a, 11b and 11c in a width direction, a lower electrode 15 is also divided to lower sub-electrodes 15a, 15b, and 15c in the width direction. A first differential amplifier 16a is connected between the upper electrodes 11a, 11b and between the lower electrodes 15a, 15b, and a second differential amplifier 17a is connected to an intermediate electrode 13a and between an upper and lower electrodes 11c, 15c.

A case that an acceleration is applied to the piezoelectric beam 3a in a Y-axis direction will be examined. As shown in FIG. 14, since the piezoelectric beam 3a is flexed by force Fy in the Y-axis direction, tensile stress is applied on the piezoelectric beam 3a on the −Y axis side surface thereof and compressive stress is applied on the piezoelectric beam 3a on the +Y axis side surface thereof in the X-axis direction, respectively. At the time, a charge is generated to piezoelectric films 12 and 14 in the Z-axis direction by a piezoelectric operation, and the polarity of the charge on the +Y side surface is reversed from that of the charge on the −Y side surface. That is, since the polarity of the charge is reversed between the divided upper sub-electrodes 11a and 11b or between the divided lower sub-electrodes 15a and 15b, the magnitude of the acceleration applied in the Y-axis direction can be detected by measuring the potential difference between the sub-electrodes 11a and the sub-electrode 11b or between the sub-electrode 15a and the sub-electrode 15b by the first differential amplifier 16a.

At the time, since the sub-electrodes 11c and 15c are formed at the center of the piezoelectric beam 3a, no potential difference is generated to the intermediate electrode 13, and a second differential amplifier 17a, which is connected to the intermediate electrode 13 and the short-circuited sub-electrodes 11c and 15c, has no sensitivity to the acceleration in the Y-axis direction.

Next, a case that an acceleration is applied to the accelerometer in the Z-axis direction will be examined. The piezoelectric beam 3a is flexed in the Z-axis direction by force Fz, and compressive stress is applied on the upper piezoelectric film 12 in the X-axis direction and tensile stress is applied on the lower piezoelectric film 14 as shown in FIG. 15. Charges having an opposite sign are generated by a piezoelectric operation to the upper and lower piezoelectric films 12, 14 in the Z-axis direction. At the time, since the same voltage is generated to the intermediate electrode 13a and between the divided upper sub-electrodes 11a and 11b and the same voltage is generated to the intermediate electrode 13a and between the divided lower sub-electrodes 15a and 15b likewise, the first differential amplifier 16a has no sensitivity to an acceleration in the Z-axis direction.

In contrast, since voltages are generated to the intermediate electrode 12a and between the upper and lower sub-electrodes 11c, 15c according to the acceleration in the Z-axis direction, the magnitude of the acceleration applied in the Z-axis direction can be detected by measuring the voltages by the second differential amplifier 17a.

Next, a case that an acceleration is applied to the accelerometer in the X-axis direction will be examined. Tensile stress is approximately uniformly applied to the upper and lower piezoelectric films 12, 14 of the piezoelectric beam 3a in the X-axis direction. Accordingly, at the time, since the same voltage is generated to the intermediate electrode 13a and between the upper sub-electrodes 11a and 11b and the same voltage is generated to the intermediate electrode 13a and between the lower sub-electrodes 15a and 15b likewise, the first differential amplifier 16a connected thereto has no sensitivity to an acceleration in the X-axis direction.

Further, since small potential differences are induced between the intermediate electrode 13a and the upper sub-electrode 11c and between the intermediate electrode 13a and the lower sub-electrode 15c, the second differential amplifier 17a, which is connected to the intermediate electrode 13a and the short-circuited sub-electrodes 11c and 15c, has a small amount of sensitivity to the acceleration in the X-axis direction.

As described above, when accelerations are applied on a proofmass 4 in the X-, Y-, and Z-axis directions, charges are generated in modes which are specific to the respective piezoelectric beams depending on the respective cases. Moreover, generated charges have amounts relating to the magnitudes of accelerations and the generated charges have a polarity which is determined depending on the direction of the acceleration applied on the proofmass 4. When, for example, force −Fy is applied in a −Y-axis direction in FIG. 14, the signs of the charges generated to the respective sub-electrodes are reversed. Likewise, when force −Fz is applied in a −Z-axis direction in FIG. 15, the signs of the charges generated to the respective electrodes are reversed. Eventually, accelerations in the X-, Y-, Z-axis directions can be detected by detecting the charges generated to the respective piezoelectric beams.

Note that it is needless to say that when accelerations applied in the Y-, X-, and Z-axis directions, they can be independently detected by forming a circuit to which the outputs from the first differential amplifiers 16a to 16d and the second differential amplifiers 17a to 17d are connected as shown in FIG. 8.

Second Modification of Embodiment 1

An accelerometer of a second modification is the same as that of the embodiment 1 except that the piezoelectric beams of the accelerometer of the embodiment 1 have a unimorph structure although the accelerometer of the embodiment 1 has the bimorph structure. Accordingly, the description of overlapping contents is omitted.

Figure 16:
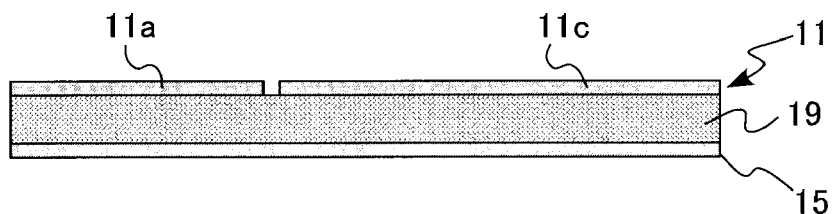
FIG. 16 is a cross sectional view of a piezoelectric beam of a second modification of the embodiment 1.

FIG. 16 is a cross sectional view of a piezoelectric beam of the second modification. FIG. 16 corresponds to FIG. 4 of the embodiment 1. The piezoelectric beam has a stacked structure composed of an upper electrode 11, a piezoelectric film 19, and a lower electrode 15 stacked from an upper surface thereof in this order.

The same effect as that of the embodiment 1 can be also obtained even in the second modification in which the piezoelectric beams have the unimorph structure.

Embodiment 2

An inertia sensor of an embodiment 2 has a substrate, a flat-sheet-shaped proofmass, which is formed on the substrate and has a stacked structure including at least a lower electrode, a piezoelectric film, and an upper electrode, an anchor unit formed in a cutout inside of the proofmass and fixed on the substrate, and a plurality of flat-sheet-shaped piezoelectric beams each having one end connected to the proofmass, the other end connected to the anchor unit, and having a stacked structure formed in a cutout inside of the proofmass and including at least a lower electrode, a piezoelectric film, and an upper electrode. A resonating motion is applied to the proofmass by any of the plurality of piezoelectric beams in one direction and Coriolis force applied on the proofmass is detected based on the charge generated to any of the electrodes of the plurality of piezoelectric beams.

Although the inertia sensor of the embodiment 1 is the accelerometer, the inertia sensor of the embodiment 2 is an angular rate sensor. Since the structure of the angular rate sensor of the embodiment 2 is almost the same as that of the embodiment 1, description of the contents overlapping those of the embodiment 1 is omitted.

The angular rate sensor of the embodiment 2 has the same effect as that of the embodiment 1. More specifically, the accelerometer can cancel the influence of warp and residual stress generated to the proofmass and the piezoelectric films constituting the piezoelectric beams when the accelerometer is manufactured by supporting the proofmass by the anchor unit formed in the proofmass. Accordingly, an angular rate sensor having an excellent performance can be easily manufactured using a piezoelectric device. Further, since the angular rate sensor has such a structure that the piezoelectric beams are disposed inside of the proofmass in place of being disposed outside of the proofmass, the size of the angular rate sensor can be greatly reduced.

Figure 17:
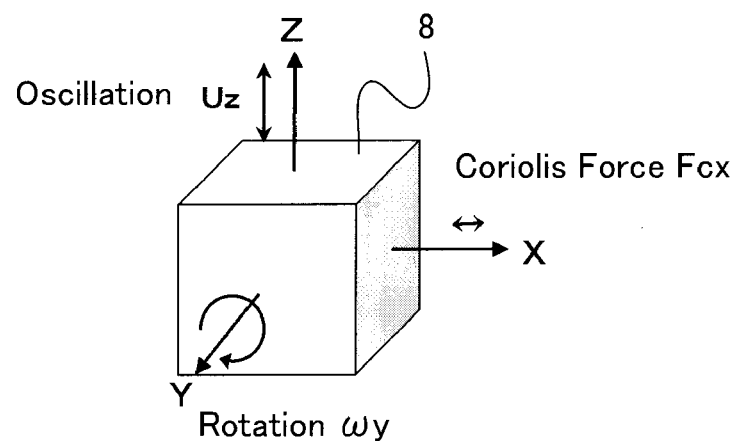
FIG. 17 is an explanatory view of a basic principle of an angular rate sensor.

The angular rate sensor of the embodiment 2 detects an angular velocity making use of the Coriolis force. FIG. 17 is an explanatory view of a basic principle of the angular rate sensor. It is assumed that an oscillator 8 is disposed at the origin of the three-dimensional X-, Y-, Z-coordinate system. An angular velocity $\omega_y$ about a Y-axis of the oscillator 8 can be detected by measuring the Coriolis force Fcx generated in an X-axis direction when oscillation (resonating motion) Uz is applied to the oscillator 8 in a Z-axis direction as shown in FIG. 17. The generated Coriolis force Fcx is shown by the following equation.

$$Fcx = 2m \cdot v_z \cdot \omega_y$$

In the above equation, m shows mass of the oscillator 8, $v_z$ shows instantaneous speed when the oscillator 8 oscillates, and $\omega_y$ shows instantaneous angular velocity of the oscillator 8. Further, an angular velocity $\omega_x$ about an X-axis of the oscillator 8 can be detected by measuring the Coriolis force Fcy generated in a Y-axis direction. To detect angular velocities in the X-axis and the Y-axis as described above, a mechanism for oscillating the oscillator 8 in the Z-axis direction, a mechanism for detecting the Coriolis force Fcx applied on the oscillator 8 in the X-axis direction, and a mechanism for detecting the Coriolis force Fcy in the Y-axis direction are necessary.

Figure 18:
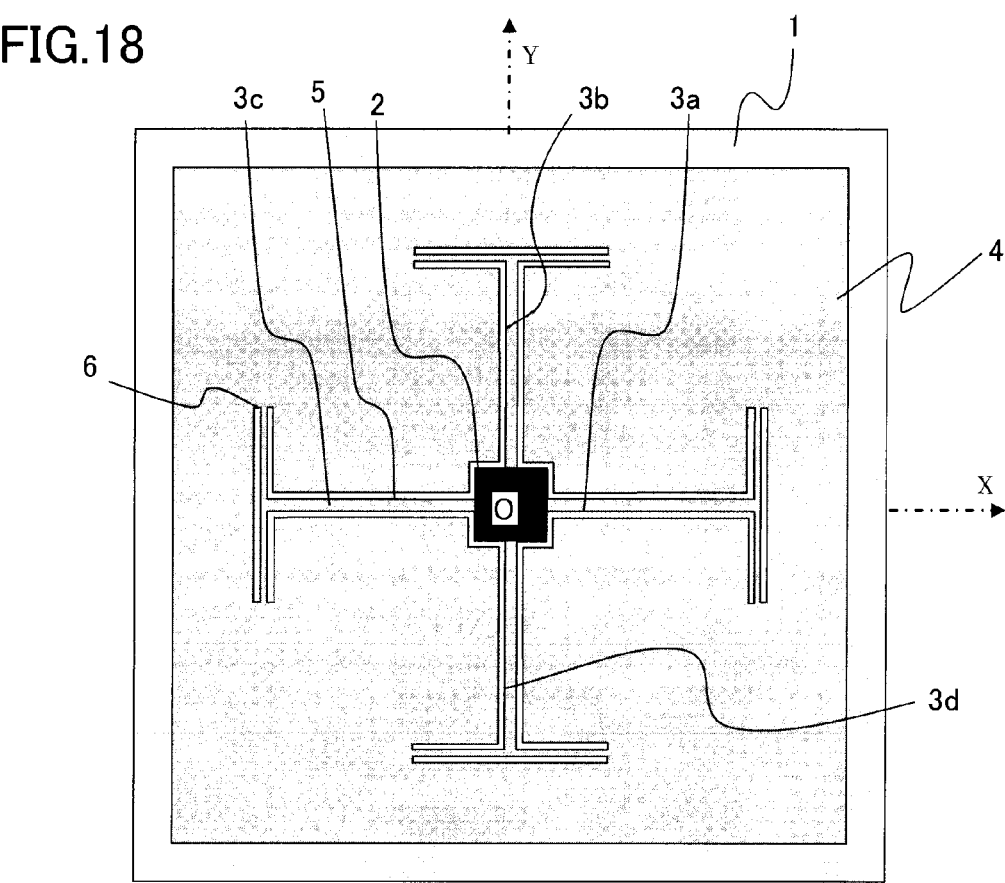
FIG. 18 is a top view of an angular rate sensor of an embodiment 2.
Figure 19:
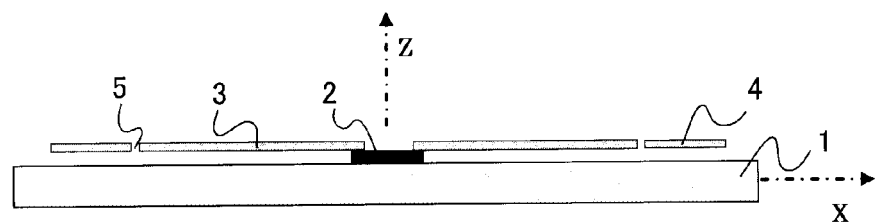
FIG. 19 is a cross sectional view taken along A-A line of FIG. 18.

FIG. 18 is a top view of the accelerometer of the embodiment 2. FIG. 19 is a cross sectional view of FIG. 18. The angular rate sensor has four T-shaped piezoelectric beams 3a to 3d which are disposed thereto and act as oscillation beams or detection beams for radially connecting an anchor unit 2 to a proofmass 4. Although the two piezoelectric beams 3a and 3c disposed on the X-axis are used to detect a Z-axis oscillation and Y-axis Coriolis force and the two piezoelectric beams 3b and 3d disposed on the Y-axis are used to detect the Z-axis oscillation and X-axis Coriolis force, these piezoelectric beams 3a to 3d have the same structure.

Figure 20:
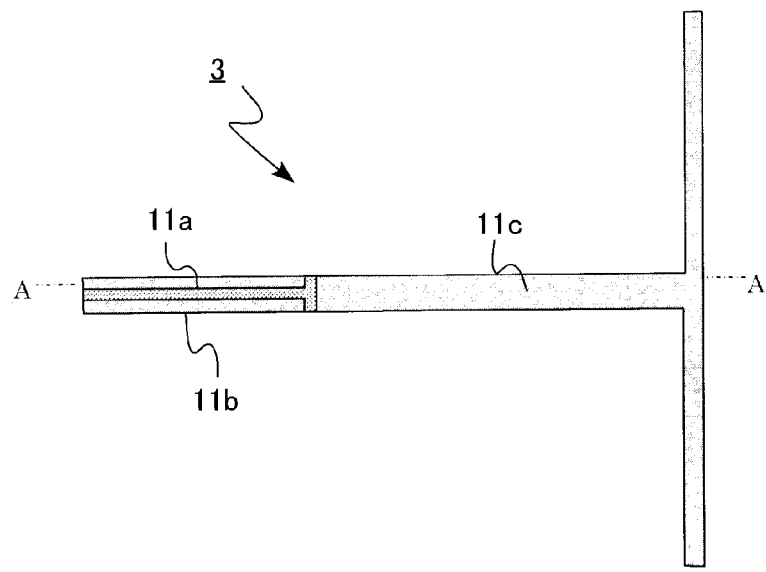
FIG. 20 is a plan view of each of piezoelectric beams of the angular rate sensor of the embodiment 2.
Figure 21:
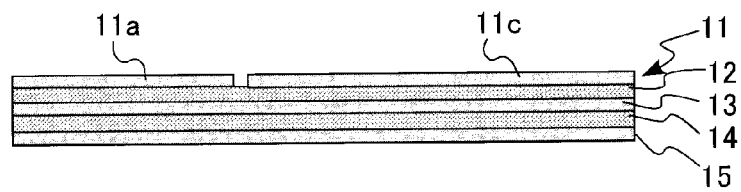
FIG. 21 is a cross sectional view taken along A-A line of FIG. 20.

FIG. 20 is a plan view of each of the piezoelectric beams 3a to 3d. FIG. 21 is a cross sectional view taken along A-A line of FIG. 20. Each of the piezoelectric beams 3a to 3d is including an upper electrode 11, an upper piezoelectric film 12, an intermediate electrode 13, a lower piezoelectric film 14, and a lower electrode 15. Each of the piezoelectric films 12 and 14 has a polarization in the Z-axis direction. The upper electrode 11 is divided to a first portion 11a, a second portion 11b, and a third portion 11c.

In general, a piezoelectric film has such a property that when a voltage is applied thereto from the outside, pressure is generated in a piezoelectric device in a predetermined direction. What phenomenon occurs when a voltage is applied between the electrodes of the piezoelectric beam 3a will be explained using FIG. 21.

When a positive voltage is applied to the electrode 13 of the piezoelectric beam 3a and a negative voltage is applied to the electrode 15 thereof, since the second piezoelectric film 14 is polarized in the Z-axis direction, compressive stress is generated in a thickness direction (Z-axis direction) and tensile stress is generated in the X-axis direction and the Y-axis direction. Accordingly, the piezoelectric beams 3a to 3d are flexed in the negative direction of the Z-axis. As a result, the proofmass 4 is offset in the negative direction of the Z-axis.

When the polarities of the voltages supplied to the electrode 13 and 15 are reversed, the expansion/contraction state of the piezoelectric films are also reversed, and thus the proofmass 4 is offset in the positive direction of the Z-axis. When the polarities of the supplied voltages are alternately reversed to cause the two offset states to occur alternately, the proofmass 4 can be reciprocatingly moved in the Z-axis direction. In other words, an oscillation Uz can be applied to the proofmass 4 in the Z-axis direction. The voltages can be supplied as described above by applying an alternate current signal between confronting electrodes.

Figure 22:
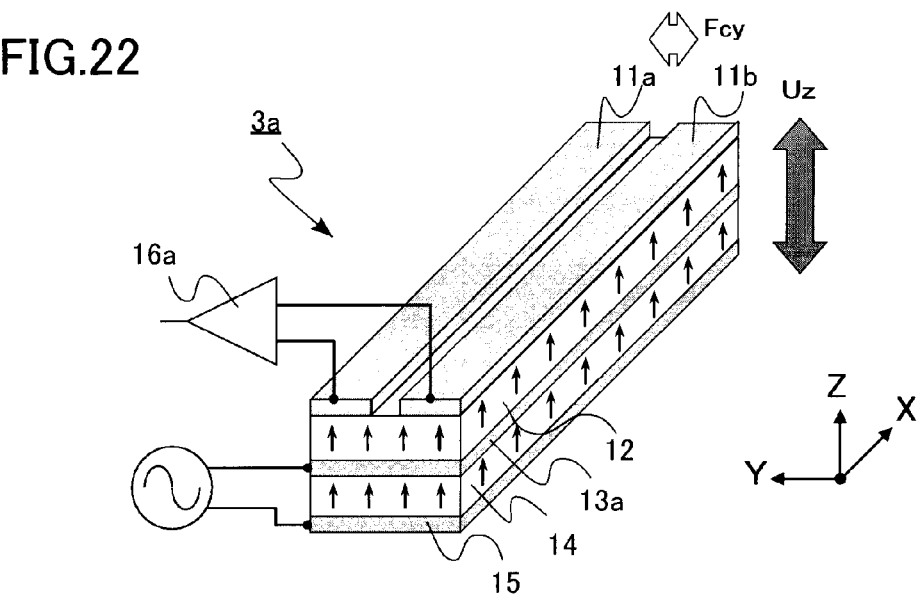
FIG. 22 is an explanatory view of a method of detecting Coriolis force of the angular rate sensor of the embodiment 2.

Subsequently, a method of detecting Coriolis force by the angular rate sensor of the embodiment 2 will be explained. FIG. 22 is a view explaining the method of detecting the Coriolis force. A mechanism for detecting the Coriolis force is basically the same as the mechanism for detecting an acceleration described in the embodiment 1.

First, as shown in FIG. 22, when the proofmass 4 is oscillated (executes resonating motion) in the Z-axis direction by the oscillation mechanism described above and rotation occurs about the X-axis at the time, the Coriolis force Fcy is applied in the Y-axis direction as described already. The Coriolis force Fcy can be measured likewise the force Fy generated by an acceleration. More specifically, since the polarities of charges are reversed in the divided first electrodes 11a and 11b, the magnitude of the Coriolis force Fcy applied in the Y-axis direction can be detected by measuring the voltage between the electrodes 11a and 11b by a differential amplifier 16a.

Further, in the angular rate sensor, since charges are also generated by an acceleration Ay in the Y-axis direction as shown as to the accelerometer of the embodiment 1, electromotive force Vy is generated to the differential amplifier 16a. Two kinds of methods can be employed as a method of separating the electromotive force generated by the Coriolis force Fcy in the Y-axis direction from the electromotive force generated by the acceleration Ay.

A first method is a method of using a frequency filter. Although almost all the frequency components of an acceleration are ordinarily several tens of hertz or less, Coriolis force depends only on the oscillation frequency of the oscillator and the oscillation frequency thereof is set to about several kilohertz to several tens of kilohertz. Accordingly, only a Coriolis force component, which is synchronized with the oscillation frequency, can be output by connecting a high path filter having a cut-off frequency of several hundreds of hertz to a detection circuit.

Figure 23:
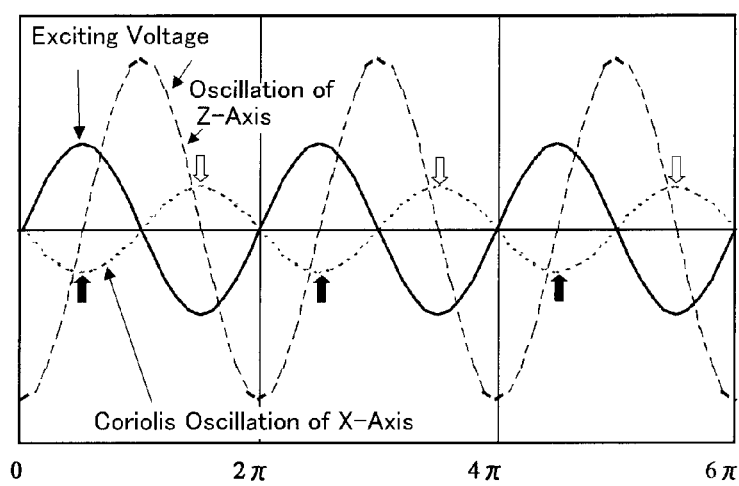
FIG. 23 is a graph showing a phase relation between oscillations of the angular rate sensor of the embodiment 2.

A second method is a method of directly determining electromotive force caused by the Coriolis force by executing A/D conversion in synchronization with an excitation cycle and an oscillation cycle. FIG. 23 is a graph showing the phase relation among an exciting voltage, Z-axis oscillation, and oscillation generated by the Coriolis force. The phase of oscillation in the Z-axis direction is delayed $\pi/2$ to an exciting voltage, and the oscillation in the Y-axis direction caused by the Coriolis force is delayed $\pi/2$ to the oscillation in the Z-axis direction. Accordingly, the oscillation in the Y-axis direction caused by the Coriolis force is delayed $\pi$ to the exciting voltage.

Thus, the maximum value and the minimum value of electromotive force of the Y-axis can be obtained by sampling the electromotive force of the Y-axis in the phases of $(2n+1/2)\pi$ and $(2n+3/2)\pi$ to the phase of the exciting voltage and subjecting the sampled electromotive force to D/A conversion. The Coriolis force can be measured from the difference between the maximum value and the minimum value. Further, the average value of the maximum value and the minimum value corresponds to an acceleration in the Y-axis direction.

Figure 24:
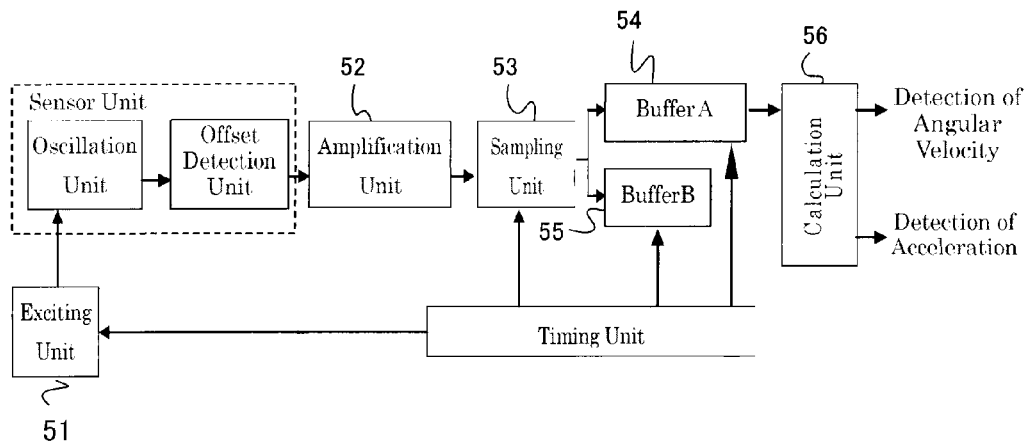
FIG. 24 is a block diagram of the angular rate sensor of the embodiment 2.

FIG. 24 is a block diagram of a circuit for separating an angular velocity from an acceleration using the second method. An exciting unit 51 is used to oscillate the proofmass 4 in the Z-axis direction as described above. An offset detection unit is including the electrodes 11a, 11b of the drive/piezoelectric beams 3a to 3d shown in FIG. 18. An amplification unit 52 is used to amplify an output voltage Vy detected by the offset detection unit to an appropriate value.

A timing unit 50 controls a sensor output that is output from the amplification unit 52 at timing extracted from a sampling unit 53 by creating a drive signal So for controlling the exciting unit 51 for oscillating the proofmass 4, creating a timing signal approximately in synchronization with the drive signal So output to the exciting unit 51, and outputting the timing signal to the sampling unit 53 to be described later.

Note that the timing signal, which is output from the timing unit 50 to the sampling unit 53, includes two types of timing signals, i.e., a timing signal for a buffer A which is delayed $1/2\pi$ to the phase of the exciting unit and a timing signal for a buffer B which is delayed $3/2\pi$ to the phase of the exciting unit, and these timing signals are created by the timing unit 50.

The sampling unit 53 samples the sensor output from the amplification unit 52 according to the timing signal output from the timing unit 50 as described above.

A buffer A 54 as a first memory means stores the value of the sensor output sampled from the sampling unit 53 at the timing of the timing signal output from the timing unit 50 and delayed $1/2\pi$. Further, a buffer B 55 as a second memory means stores the value of the sensor output sampled by the sampling unit 53 at the timing of the timing signal output from the timing unit 50 and delayed $3/2\pi$.

A calculation unit 56 executes a predetermined calculation to determine an angular velocity $\omega$ is applied on a proofmass 3 using the value of the sensor output stored to the buffer A54 and the value of the sensor output stored to the buffer B55. The amplitude of the oscillation generated by the Coriolis force can be determined by obtaining the difference between the value of the sensor output stored to the buffer A 54 and the value of the sensor output stored to the buffer B 55.

Note that the value of an acceleration can be determined from the sensor output. In this case, when the value of the sensor output stored to the buffer A 54 is added with the value of the sensor output stored to the buffer B55, an output signal derived from an angular velocity is cancelled and an output signal derived from the acceleration can be determined.

Note that arrows from the timing unit 50 shown in FIG. 24 to the buffers A 54, B 55 and arrows from the buffers A 54, B 55 to the calculation unit 56 are synchronization signals for synchronizing the timing signal from the timing unit 50 to the sampling unit 53, the timing of the buffering to the buffers A 54, B 55, and the timing of calculation of the calculation unit 56.

As described above, only the Coriolis force Fcy in the Y-axis direction can be detected by the piezoelectric beam 3a for detecting the Coriolis force Fcy in the Y-axis direction without being affected by the oscillation in the Z-axis direction and the acceleration in the Y-axis direction (it is needless to say that the accelerations in the X-axis direction and the Z-axis direction are included).

Another piezoelectric beam 3c formed along the X-axis can also detect the Coriolis force Fcy in the Y-axis direction in the entirely same manner as the piezoelectric beam 3a. Further, the piezoelectric beams 3b and 3d formed along the Y-axis can detect the Coriolis force Fcx in the X-axis direction.

As described above, the embodiment 2 can realize the angular rate sensor having sensitivity to rotating speeds about the X-axis and the Y-axis. The angular rate sensor of the embodiment 2 is similar to the accelerometer of the embodiment 1 in that it can be made easily and the size thereof can be greatly reduced. Further, the inertia sensor of the embodiment 2 can also be applied as both the angular velocity and the accelerometers making use of the arrangement shown in FIG. 24.

Third Embodiment

An inertia sensor of a third embodiment is different from the angular rate sensor of the embodiment 2 in that although the angular rate sensor of the embodiment 2 has the piezoelectric beams of the T-shaped bimorph structure, the inertia sensor of the third embodiment is an angular rate sensor having piezoelectric beams of an L-shaped unimorph structure. Description of the contents of the third embodiment overlapping those of the embodiment 2 is omitted.

Figure 25:
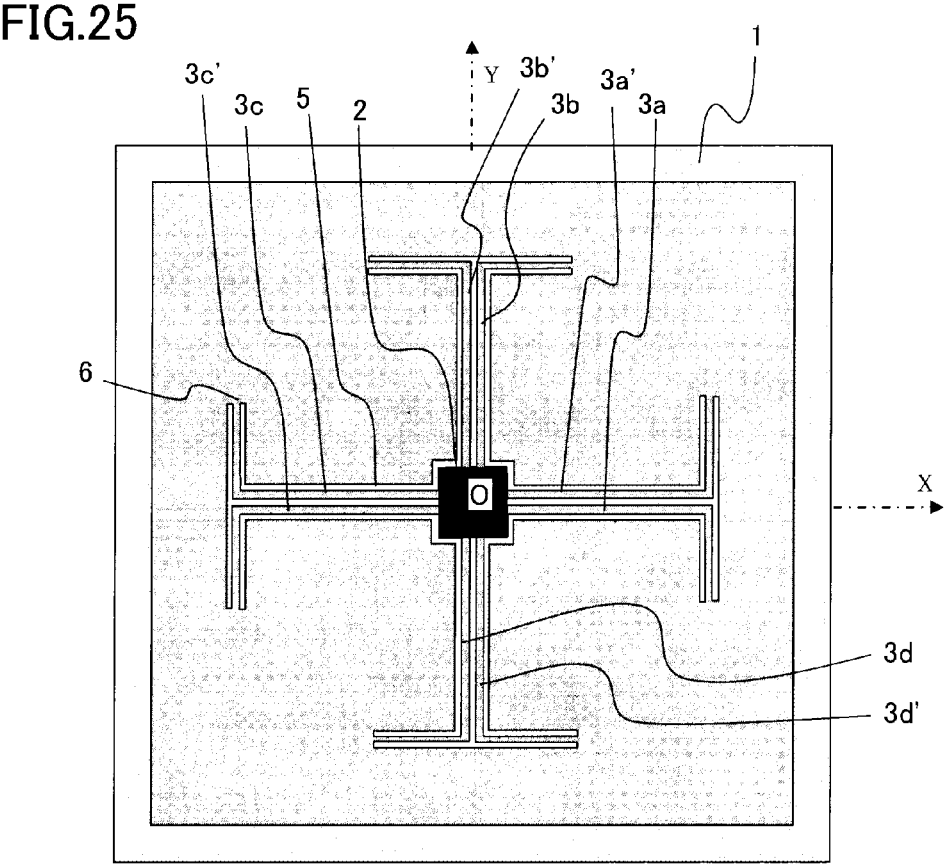
FIG. 25 is a top view of an angular rate sensor of a third embodiment.

FIG. 25 is a top view of the angular rate sensor of the third embodiment. The angular rate sensor has eight piezoelectric beams 3a, 3a', 3b, 3b', 3c, 3c', 3d, 3d' acting as L-shaped excitation beams or detection beams which are disposed thereto and radially connect an anchor unit 2 to a proofmass 4. The four the piezoelectric beams 3a, 3a', 3c, 3c', disposed on an X-axis are used for exciting a Y-axis and the four piezoelectric beams 3b, 3b', 3d, 3d' disposed on a Y-axis are used for detecting Coriolis force of the X-axis, these piezoelectric beams have the same unimorph structure.

Figure 26:
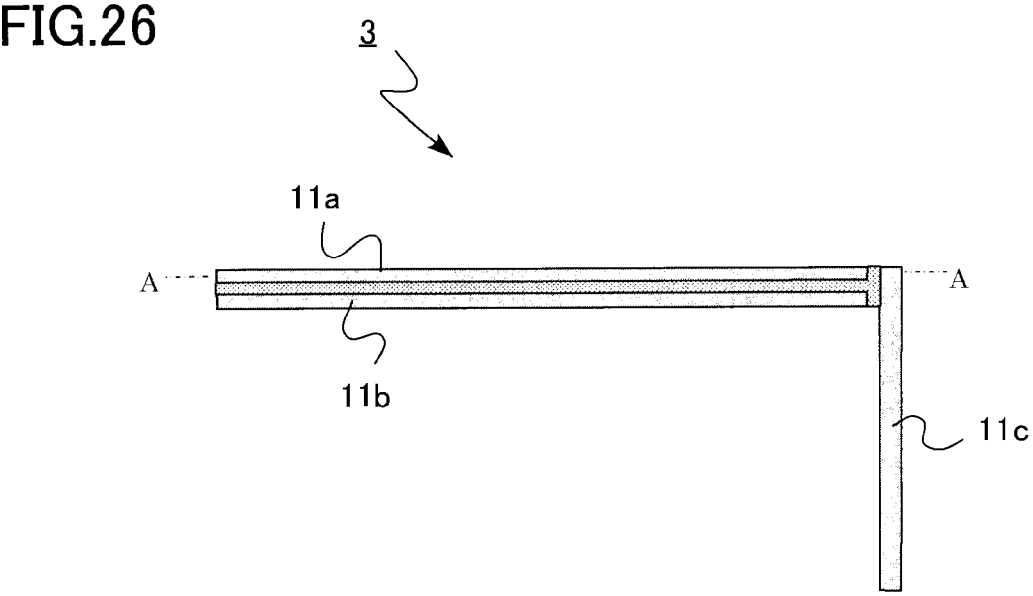
FIG. 26 is a plan view of each of piezoelectric beams of the angular rate sensor of the third embodiment.
Figure 27:
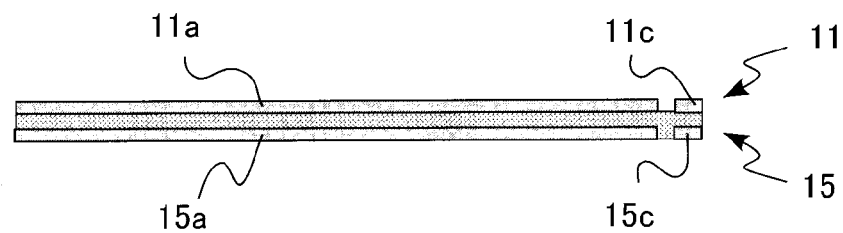
FIG. 27 is a cross sectional view taken along A-A line of FIG. 26.

FIG. 26 is a plan view of the piezoelectric beams 3a, 3a', 3b, 3b', 3c, 3c', 3d, 3d'. Note that although FIG. 26 shows each of the piezoelectric beams 3a, 3b, 3c, 3d as an example, the piezoelectric beams 3a' 3b', 3c', 3d' have the direction of an L-shape is reversed in FIG. 26. FIG. 27 is a cross sectional view taken along A-A line of FIG. 26. Each of the piezoelectric beams 3a, 3a', 3b, 3b', 3c, 3c', 3d, 3d' is including an upper electrode 11, a piezoelectric film 12, and a lower electrode 15. The piezoelectric film 12 has a polarization in a Z-axis direction. The upper electrode 11 is divided to a first portion 11a, a second portion 11b, and a third portion 11c. The upper electrode 15 is also divided to a first portion 15a, a second portion 15b, and a third portion 15c.

Figure 28:
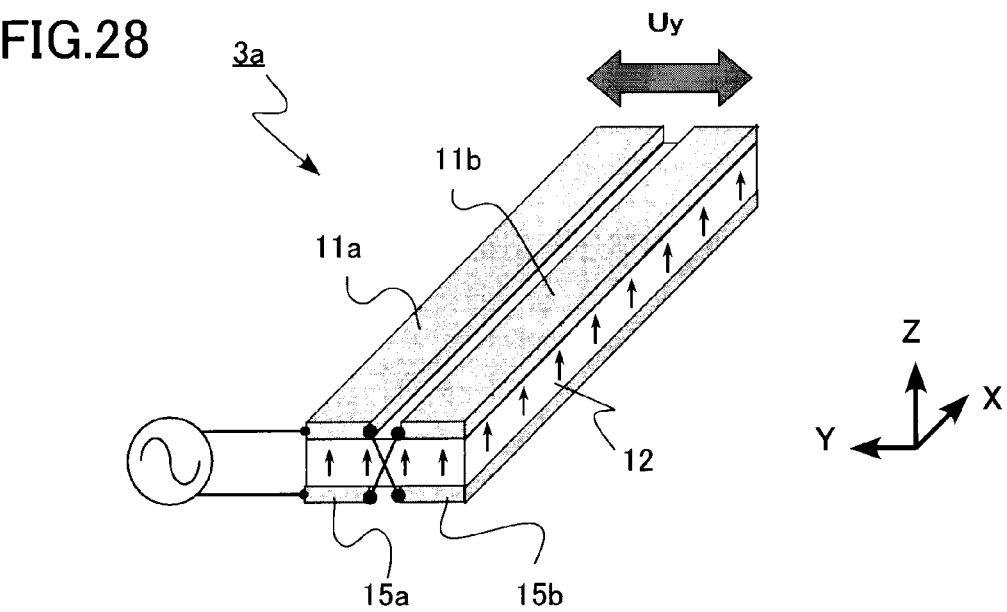
FIG. 28 is an explanatory view of a method of detecting Coriolis force of the angular rate sensor of the third embodiment.
Figure 29:
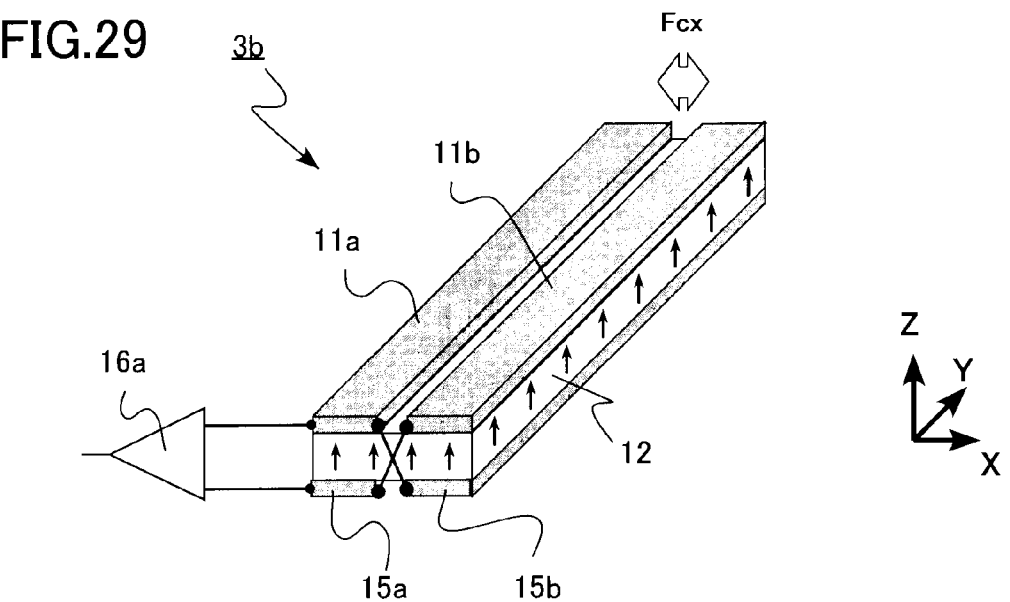
FIG. 29 is an explanatory view of the method of detecting the Coriolis force of the angular rate sensor of the third embodiment.

FIGS. 28 and 29 are explanatory views of a method of detecting Coriolis force of the angular rate sensor of the third embodiment. FIG. 28 shows the piezoelectric beam 3a for exciting the Y-axis, FIG. 29 shows the piezoelectric beam 3b for detecting the Coriolis force of the X-axis.

As shown in FIG. 28, the proofmass 4 is reciprocatingly moved in a Y-axis direction by applying an alternate current signal between the upper electrodes 11 and the lower electrodes 15 of the piezoelectric beams for exciting the Y-axis. At the time, when rotation is applied about the Z-axis, Coriolis force Fcx is applied in an X-axis direction as shown in FIG. 29. More specifically, the polarities of charges are reversed in the upper electrodes 11 and the lower electrodes 15, and the magnitude of the Coriolis force Fcx applied in an X-axis direction can be detected by measuring the voltage between the upper electrode 11 and the lower electrode 15 by a differential amplifier 16a.

As described above, the third embodiment can realize the angular rate sensor having sensitivity to a rotating speed about the Z-axis. The angular rate sensor of the third embodiment is similar to the accelerometer of the embodiment 1 and the angular rate sensor of the embodiment 2 in that it can be made easily and the size thereof can be greatly reduced.

The embodiments of the present invention have been explained above referring to the specific examples. The above embodiments are only examples and do not restrict the present invention. In the explanation of the embodiments, although the portions which are not directly necessary to the explanation of the present invention as to the inertia sensor, the method of manufacturing the inertia sensor, and the like are not explained, elements relating to a necessary inertia sensor, a method of making the inertia sensor, and the like can be appropriately selected and used.

In addition to the above arrangements, all the inertia sensors which can be appropriately designed and modified by persons skilled in the art are included in the scope of the present invention. The scope of the present invention is defined by the scope of claims and the scope of the equivalent of the claims.

What is claimed is:

1. An inertia sensor comprising:
a substrate;
a flat proofmass formed over the substrate and having a stacked structure including at least a lower electrode, a piezoelectric film, and an upper electrode;
an anchor unit formed in a cutout inside of the proofmass and fixed on the substrate; and
a plurality of flat piezoelectric beams formed in the cutout inside of the proofmass, each of the flat piezoelectric beams having a first end connected to the proofmass and a second end connected to the anchor unit, and having a stacked structure including at least a lower electrode, a piezoelectric film, and an upper electrode, the inertia sensor detecting an acceleration applied on the proofmass based on charges generated to the electrodes of the piezoelectric beams,
wherein each of the piezoelectric beams has a T-shape in which the piezoelectric beam is connected to the proofmass at two positions, and
wherein a shape of the cutout inside of the proofmass is conformal to a shape of the anchor unit and the piezoelectric beams.

2. The inertia sensor according to claim 1, wherein each of the proofmass and the piezoelectric beams has a stacked structure including a lower electrode, a first piezoelectric film, an intermediate electrode, a second piezoelectric film, and an upper electrode.

3. The sensor according to claim 1, wherein the anchor unit is formed at the center of gravity of the proofmass, and the plurality of piezoelectric beams are formed symmetrically to the center of gravity.

4. The sensor according to claim 1, wherein the piezoelectric film is AlN or ZnO oriented in a vertical direction to a film surface.

5. An inertia sensor comprising:
a substrate;
a flat proofmass formed over the substrate and having a stacked structure including at least a lower electrode, a piezoelectric film, and an upper electrode;
an anchor unit formed in a cutout inside of the proofmass and fixed on the substrate; and
a plurality of flat piezoelectric beams formed in a cutout inside of the proofmass, each of the flat piezoelectric beams having a first end connected to the proofmass and a second end connected to the anchor unit, and having a stacked structure including at least a lower electrode, a piezoelectric film, and an upper electrode,
wherein the inertia sensor applies a resonating motion in one direction to the proofmass by any of the plurality of piezoelectric beams and enables to detect Coriolis force applied on the proofmass based on a charge generated to any of the plurality of piezoelectric beams,
wherein each of the piezoelectric beams has a T-shape in which the piezoelectric beam is connected to the proofmass at two positions, and
wherein a shape of the cutout inside of the proofmass is conformal to a shape of the anchor unit and the piezoelectric beams.

6. The sensor according to claim 5, wherein each of the proofmass and the piezoelectric beams has a stacked structure including a lower electrode, a first piezoelectric film, an inter mediate electrode, a second piezoelectric film, and an upper electrode.

7. The sensor according to claim 5, wherein the anchor unit is formed at the center of gravity of the proofmass, and the plurality of piezoelectric beams are formed symmetrically to the center of gravity.

8. The sensor according to claim 5, wherein the piezoelectric film is AlN or ZnO oriented in a vertical direction to a film surface.

* * * * *